(12) United States Patent
Kordosky et al.

(10) Patent No.: US 7,635,457 B2
(45) Date of Patent: Dec. 22, 2009

(54) METHOD FOR HEAP AND DUMP LEACHING COUPLED WITH SOLVENT EXTRACTION FOR METAL RECOVERY

(75) Inventors: Gary A. Kordosky, Tucson, AZ (US); Andrew Nisbett, Tucson, AZ (US); Hans C. Hein, Santiago (CL)

(73) Assignee: COGNIS IP Management GmbH, Duesseldorf (DE)

( * ) Notice: Subject to any disclaimer, the term of this patent is extended or adjusted under 35 U.S.C. 154(b) by 778 days.

(21) Appl. No.: 11/230,391

(22) Filed: Sep. 20, 2005

(65) Prior Publication Data

US 2006/0088458 A1 Apr. 27, 2006

Related U.S. Application Data

(60) Provisional application No. 60/615,708, filed on Oct. 4, 2004.

(51) Int. Cl.
*C21B 15/00* (2006.01)
(52) U.S. Cl. ............... 423/24; 423/99; 423/139; 75/743
(58) Field of Classification Search .......... 423/24, 423/27, 38, 41, 99, 109, 139, 150.1; 75/743
See application file for complete search history.

(56) References Cited

U.S. PATENT DOCUMENTS

| | | | |
|---|---|---|---|
| 4,039,405 A | 8/1977 | Wong | |
| 5,316,567 A | 5/1994 | Jones | |
| 5,919,674 A | 7/1999 | Tunley | |
| 7,166,144 B2 * | 1/2007 | Hein et al. | 75/722 |
| 7,214,256 B2 * | 5/2007 | Kordosky et al. | 75/721 |
| 2003/0230171 A1 | 12/2003 | Imamura et al. | |
| 2005/0031512 A1 | 2/2005 | Kordosky et al. | |

OTHER PUBLICATIONS

Witt et al., "Heap Leaching Practices At San Manuel Oxide Operations", Copper 99-Cobre 99 International Conference, vol. IV, The Minerals, Metals & Materials Society, (1999), pp. 41-51 & 54-55.
Dagoberto Ibaceta and Juan Garrido Dos Amigos, Cemin and Hans Hein and Gabriel Araya Cognis: SX Development at Dos Amigos in Northern Chile. Presented by Hans Hein.

\* cited by examiner

*Primary Examiner*—Steven Bos (57) ABSTRACT

The disclosed invention provides a process for enhanced recovery of one or more metal values from heap and/or dump leaching of ores containing the metal values, the process comprising:
(a) providing a high grade leach solution obtained by heap or dump leaching of fresh high grade ore containing a first metal value;
(b) subjecting the high grade leach solution to a first solvent extraction of the first metal value and applying the resulting first aqueous raffinate to leach fresh high grade ore;
(c) providing a low grade leach solution obtained by heap or dump leaching of partially leached ore or fresh low grade ore of the first metal value; and
(d) subjecting the low grade leach solution to a second solvent extraction of the first metal value, separate from the first solvent extraction of the first metal value, and applying the resulting separate, second aqueous to leach partially leached ore or fresh low grade ore, wherein the first and second aqueous raffinates are not intermixed prior to being applied to their respective ores for leaching. Alternatively, the first and second raffinates may be intermixed prior to being applied to their respective ores for leaching, providing that the aqueous raffinate applied to fresh high grade ore comprises at least 60% by volume of the first aqueous raffinate and the aqueous raffinate applied to partially leached ore or fresh low grade ore comprises at least 60% by volume of the second aqueous raffinate.

24 Claims, 4 Drawing Sheets

Figure 1: Recovery of Cu per Leaching Module as a function of time

Figure 2: Cu Concentration of Leach solution as a function of time

Figure 3: Nominal High and Low grade Leach solutions

Figure 4. Typical Metal Heap or Dump Leach Process Incorporating Metal Solvent Extraction on the Combined High and Low Grade Leach Solutions Figure 5. New Metal Heap or Dump Leaching Process Incorporating Metal Solvent Extraction Separately on the High and Low Grade Leach Solutions

METHOD FOR HEAP AND DUMP LEACHING COUPLED WITH SOLVENT EXTRACTION FOR METAL RECOVERY

CROSS-REFERENCE TO RELATED APPLICATIONS

This application claims priority under 35 U.S.C. §119(e) from provisional U.S. Patent Application No. 60/615,708, filed on Oct. 4, 2004.

BACKGROUND OF THE INVENTION

Most metals are obtained by removing those metal values from the ores in which they are found in the ground. Once the ore has been mined, the metal must then be separated from the remainder of the ore. One method to separate the metal from the ore is known as leaching. In general, the first step in this process is contacting the mined ore with an aqueous solution containing a leaching agent which extracts the metal from the ore into solution. For example, in copper leaching operations, such as, for example, in the heap or dump leaching of copper ores, sulfuric acid in an aqueous solution is contacted with copper oxide and sulfide minerals of the ore. During the leaching process, acid in the leach solution is consumed and copper is dissolved thereby increasing the copper content of the aqueous leach solution.

The aqueous leach solution containing the leached metal can then be treated via a known process referred to as solvent extraction wherein the aqueous leach solution is contacted with a nonaqueous solution containing a metal-specific extraction reagent. The metal-specific extraction reagent extracts the metal from the aqueous phase into the non-aqueous phase. During the solvent extraction process for copper and certain other metals, the leaching agent is regenerated in the aqueous phase. In the case where sulfuric acid is the leaching agent and the metal is copper, sulfuric acid is regenerated in the aqueous phase when copper is extracted into the organic phase by the extraction reagent. Normally, for every ton of copper removed from the leach solution about 1.5 tons of sulfuric acid is re-generated in the leach solution.

After solvent extraction, the leach solution, now depleted in metal and enhanced in acid, is recycled back to the leaching process to dissolve more metal. The leach solution that exits the solvent extraction plant is called the raffinate. The solvent extraction process typically recovers some 80 to 95% of the metal in the leach solution. Thus the raffinate contains about 5-20% of the leached metal. (The raffinate is recycled back to the leach process and provides the bulk of the leach solution used in the leaching processes.)

In heap and/or dump leaching, fresh ore when leached will produce a leach solution relatively high in metal, often called a high grade leach solution, while ore that has been under leach for some time will produce a leach solution much lower in metal, often called a low grade leach solution. In most operations a leach solution from a new heap or dump will be considered high grade until it has decreased to a certain metal content and it will then be considered a low grade leach solution. A given heap or dump will remain under leach for an additional time producing a low grade leach solution until the amount of metal being leached is so small that it is no longer economical to continue to leach.

Figure 1:
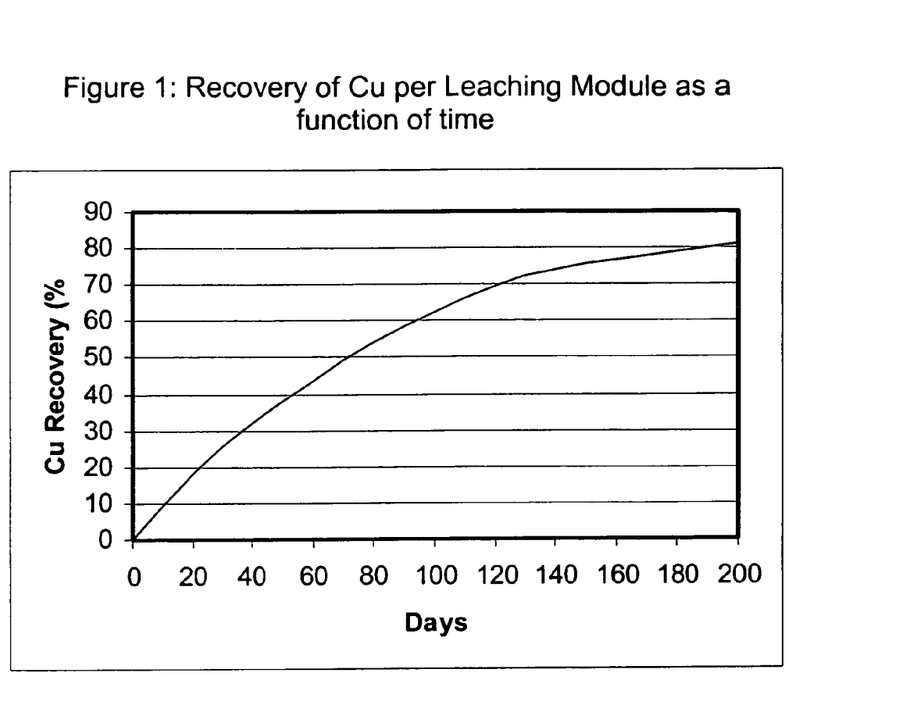
FIG. 1 is a graph showing the recovery of copper (%) per leaching module as a function of time in days.
Figure 2:
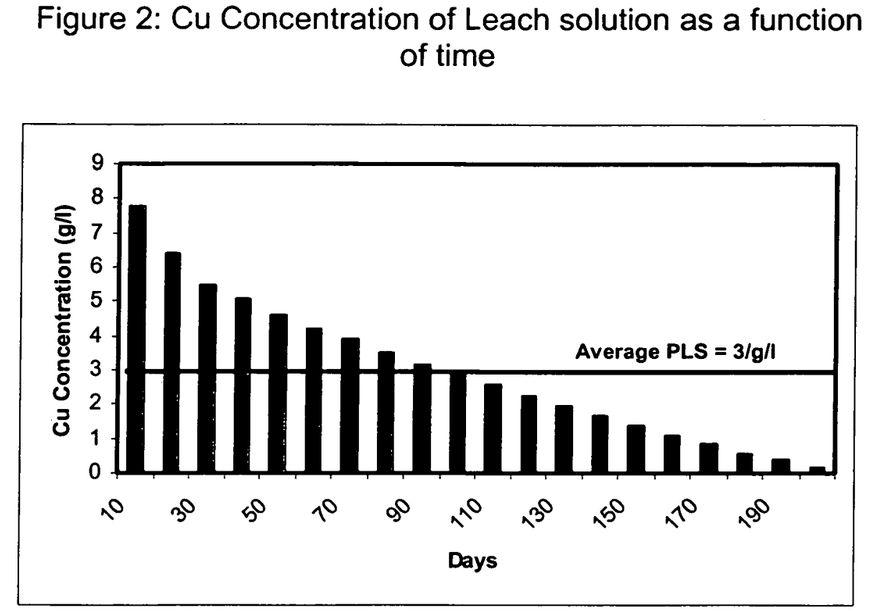
FIG. 2 is a bar graph showing the copper concentration of a leach solution as a function of time.

It is understood to one skilled in the art that the metal content of a leach solution is usually highest when the ore under leach is the freshest and that the longer the ore is under leach the lower the metal content of the leach solution produced from this ore. See FIGS. 1 and 2.

Figure 3:
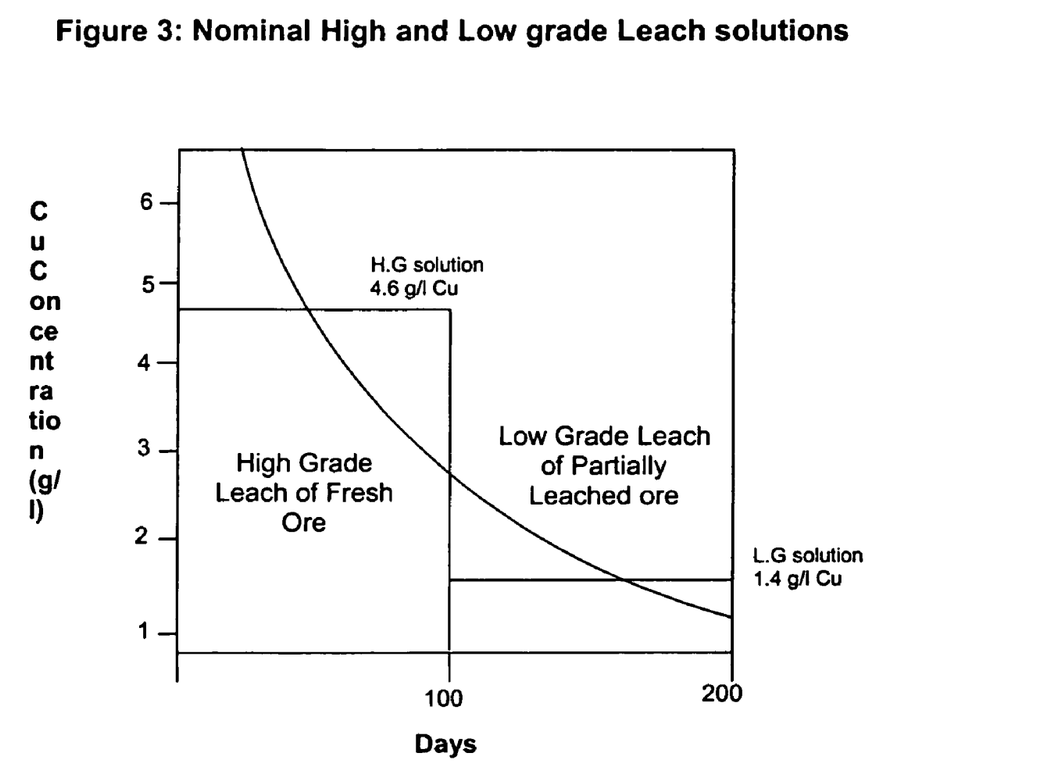
FIG. 3 is a graph showing the copper concentration of high and low grade leach solutions over time.

Often the high grade and low grade leach solutions are combined to produce a combined leach solution containing the desired metal at a concentration lower than the high grade solution and higher than the low grade leach solution. This combined leach solution is then treated in a solvent extraction plant as described above. For the purposes of this application, ore which is producing a high grade leach solution will be referred to as "fresh ore" while ore that is producing a low grade leach solution will be referred to as "partially leached ore". See FIG. 3.

Alternatively, the leaching process can be carried out in a different way. The low grade leach solution is taken to an intermediate leach solution (ILS) pond from which it is then distributed over fresh ore to give a high grade leach solution. This high grade leach solution is then treated in a solvent extraction process.

When the leaching process on the ore is complete, the ore is removed from the leaching system, that is, raffinate is no longer distributed over the ore and after a short drain down period of time leach solution is no longer collected from the ore. However, when ore is drained down, a significant amount of aqueous solution remains in the ore. After drain down, the leached ore can be moved to a new location or the leached ore can be left in place. If the leached ore is left in place, fresh ore may or may not be placed on top of the leached ore.

In the case where the leached ore is moved from the leach system to a new location, the metal contained in this ore and the metal contained in the leach solution remaining in the leached ore after drain down is lost unless a secondary leach system is put in place. If a secondary leach system is put in place, it is usually not until several or even many years after the leached ore has been relocated. Thus, the metal left in the leached ore is not recover for some significant period of time.

In the case where the leached ore is left in place and new ore is not put on top of the leached ore, the metal contained in the leached ore is lost unless the leached ore is later once again leached.

In the case where fresh ore is placed on top of leached ore and the surface of the leached ore is not made impermeable to solution penetration from the fresh ore leach solution, the total volume of live solution in the leaching system will increase and, as a result, the total metal being recycled will increase over time. Thus, the inventory of leached metal in the leaching system will increase with time.

In the various heap and dump leaching alternatives described above, all or a portion of the raffinate is distributed over the partially leached ore. Thus the amount of metal remaining in the leached ore when the leached ore is taken out of the leaching system depends to a great extent on the metal content of the raffinate. The higher the metal concentration in the raffinate, the more metal that is left in the leached ore after it is drained down and removed from the leaching system. The lower the metal content of the raffinate, the lesser the amount of metal that is left in the leached ore after it has been drained down and removed from the leaching solution.

In the case where fresh ore is placed on leached ore, the lower the metal concentration of the raffinate the lower the copper concentration of the live leaching solution and, therefore, the lower the total metal in inventory in the leaching system.

The metal left in leached ore can have significant economic value because the incremental cost to produce this metal is very low since the cost to mine and leach the metal has already been expended.

When ore is placed for heap or dump leaching, the ore particles placed for leaching vary in size from virtually powder to ⅜ inch and greater depending on the grade of the ore.

Metal on the surface of the ore is leached quickly and immediately is taken into solution. Metal inside the larger particles needs to migrate from the inside the larger particles to the surface of the particle before it can be taken into the active flow of leach solution and subsequently recovered by solvent extraction. The process of the metal migrating from the inner portion of a particle of ore to the surface through pores in the ore is called diffusion. The rate of diffusion or metal migration is dependent on the difference in the metal concentration between the leach solution moving through the ore under leach and the metal concentration of the aqueous leach solution trapped in the pores of the particles of ore. The greater the metal concentration of the leach solution trapped in the pores of the ore particles relative to the metal concentration in the leach solution moving through the ore, the greater the rate of migration of metal from the inner part of the particles of ore under leach to the surface of the ore under leach. Thus, the lower the metal concentration of the raffinate, the lower the metal concentration of the solution in the heap or dump and the faster the leached metal migrates from the inner part of the ore particles to the surface of the ore particles. The faster the metal migrates, the faster the leaching will take place and the more complete the leaching will be.

Accordingly there exists a need for an improved process for metal leaching and solvent extraction wherein the metal recovery across solvent extraction and leaching is increased with little or no added capital cost when compared to the leach/solvent extraction systems commonly used today.

BRIEF SUMMARY OF THE INVENTION

The present invention relates, in general, to recovery of metals from ores by leaching followed by solvent extraction and to methods of increasing the total metal recovered as well as increasing the rate of metal recovery.

It has been surprisingly discovered that treating the low and high grade leach solutions in separate metal solvent extraction processes, instead of combining the high and low grade leach solutions and then treating the combined leach solution in the same metal solvent extraction process, results in higher metal recovery and a lower metal containing raffinate. It also results in a faster rate of metal extraction by leaching because of the higher rate of metal diffusion from the inner part to the surface of the ore particles.

One embodiment of the present invention includes processes which comprise: (a) providing a high grade leach solution that results from leaching "fresh" ore; (b) subjecting the high grade leach solution to a first solvent extraction to provide a first raffinate that is then distributed over "fresh" ore in order to generate additional high grade leach solution; (c) providing a low grade leach solution that results from leaching "partially leached" ore or low grade ore; (d) subjecting the low grade leach solution to a second solvent extraction to provide a second raffinate that is then distributed over "partially leached" ore or low grade ore in order to generate additional low grade leach solution.

Another embodiment of the present invention includes processes which comprise: (a) providing a high grade leach solution that results from heap leaching "fresh" ore; (b) subjecting the high grade leach solution to a first solvent extraction to provide a first raffinate that is then distributed over "fresh" ore in order to generate additional high grade leach solution; (c) providing a low grade leach solution that results from heap leaching "partially leached" ore; (d) subjecting the low grade leach solution to second solvent extraction to provide a second raffinate that is then distributed over "partially leached" ore in order to generate additional low grade leach solution.

A third embodiment of the present invention includes processes which comprise: (a) providing a high grade leach solution that results from dump leaching "fresh" ore; (b) subjecting the high grade leach solution to a first solvent extraction to provide a first raffinate that is then distributed over "fresh" ore in order to generate additional high grade leach solution; (c) providing a low grade leach solution that results from dump leaching "partially leached" ore; (d) subjecting the low grade leach solution to second solvent extraction to provide a second raffinate that is then distributed over "partially leached" ore in order to generate additional low grade leach solution.

A fourth embodiment of the present invention includes processes which comprise: (a) providing a high grade leach solution that results from heap leaching higher grade "fresh" ore; (b) subjecting the high grade leach solution to a first solvent extraction to provide a first raffinate that is then distributed over "fresh" ore in order to generate additional high grade leach solution; (c) providing a low grade leach solution that results from dump leaching low grade ore; (d) subjecting the low grade leach solution to a solvent extraction to provide a second raffinate that is then distributed over more low grade ore in order to generate additional low grade leach solution.

A fifth embodiment of the present invention includes processes which comprise: (a) providing a high grade leach solution that results from heap or dump leaching "fresh" ore; (b) subjecting the high grade leach solution to a first solvent extraction to provide a first raffinate that is then distributed over "fresh" ore in order to generate additional high grade leach solution; (c) providing a low grade leach solution that results from heap or dump leaching "partially leached" ore or low grade ore; (d) subjecting the low grade leach solution to a solvent extraction to provide a second raffinate that is then distributed over "partially leached" ore or low grade ore in order to generate additional low grade leach solution.

In the invention, as exemplified by the foregoing embodiments, steps (c) and (d) are independent of steps (a) and (b), that is, the first and second raffinates are not intermixed prior to being returned/applied to their respective leaching piles. However, the invention contemplates that the two raffinates can be intermixed to the extent that at least 60%, preferably 70%, more preferably 80% and most preferably 90% of the raffinate going to the fresh high grade ore is comprised of the first raffinate and at least 60%, preferably 70%, more preferably 80% and most preferably 90% of the second raffinate goes to the partially leached ore or fresh low grade ore, the amounts being measured by volume.

In many of the preferred embodiments of the present invention, the metal comprises copper. Also, in many preferred embodiments of the present invention, the leaching agent comprises sulfuric acid. In more preferred embodiments of the present invention, the metal comprises copper and the leaching agent comprises sulfuric acid.

In another aspect, the invention provides a process for enhanced recovery of a second metal value from heap and/or dump leaching of ores containing the metal values, the process comprising:

(a) providing a high grade leach solution obtained by heap or dump leaching of fresh high grade ore containing a first metal value;

(b) subjecting the high grade leach solution to a first solvent extraction of the first metal value and applying the resulting first aqueous raffinate to leach fresh high grade ore;

(c) independently of (a) and (b), providing a low grade leach solution obtained by heap or dump leaching of partially leached ore or fresh low grade ore of the first metal value; and (d) subjecting the low grade leach solution to a second solvent extraction of the first metal value, separate from the first extraction, (e) subjecting either all or a portion of the resulting separate, second aqueous raffinate a recovery process for the second metal value, and (e) applying the portion of the second raffinate that is not treated for recovery of the second metal value to leach partially leached ore or fresh low grade ore, wherein the first and second aqueous raffinates are not intermixed prior to being applied to their respective ores for leaching. Alternatively, the first and second raffinates are intermixed prior to being applied to their respective ores for leaching, providing that the aqueous raffinate applied to fresh high grade ore comprises at least 70% by volume of the first aqueous raffinate and the aqueous raffinate applied to partially leached ore or fresh low grade ore comprises at least 70% by volume of the second aqueous raffinate. The foregoing percentages are preferably at least 80% and, more preferably, at least 90%. The recovery of the second metal value may, for example, be accomplished by first precipitating it as a hydroxide or sulfide, followed by further refining by processes known in the art.

DETAILED DESCRIPTION OF THE INVENTION

Other than in the operating examples, or where otherwise indicated, all numbers expressing quantities of ingredients or reaction conditions used herein are to be understood as modified in all instances by the term "about".

Aqueous leach solutions from heap and dump leaching operations comprise water, a leaching agent and a metal. Aqueous leach solutions can additionally contain many other metals, sulfate, chloride, nitrate, and at times water soluble organic impurities. These aqueous leach solutions are obtained from the treatment of run of mine ore, crushed ore or crushed and agglomerated ore with an aqueous solution of a leaching agent. The aqueous leach solution is typically conveyed to solvent extraction. The manner in which the aqueous leach solution, or any other solution, stream or raffinate is conveyed during the processes according to the present invention is inconsequential. In general, solutions, streams and raffinates may be conveyed by pipe or any other natural or man-made conduit.

In accordance with the present invention, a high grade leach solution is generated by leaching fresh ore, usually with raffinate or a portion of the raffinate from the first solvent extraction plant, even though this is not necessarily a requirement. This high grade leach solution is advanced to a first solvent extraction to produce a first raffinate. This high grade leach solution is not combined with a low grade leach solution as has been common in the past.

Also in accordance with the present invention a low grade leach solution is generated by leaching partially leached ore and/or low grade ore, usually with raffinate, or a portion of raffinate from the second solvent extraction (that is, the separate extraction of the low grade leach solution). This low grade leach solution is not combined with a high grade leach solution as has been common in the past, rather it is treated directly in a second solvent extraction plant.

In general, solvent extraction is carried out using well known techniques and any suitable staging and reagent for the solvent extraction plant can be employed. The particular staging for the plant is not critical. For example, the solvent extraction plant might consist of 2 extraction stages and 2 strip stages or 2 extraction stages and 1 strip stage. Another example is 1 extraction stage followed by 2 extraction stages and 1 strip stage in what is called the series parallel stage configuration. In the series parallel staging configuration, the high grade leach solution might be treated in the 2 extraction stages and the low grade leach solution in the single extraction stage. In some cases wash stages may also be employed.

The processes according to the present invention can be used in any metal recovery operation which employs an aqueous heap and/or dump leaching operation and where a proper solvent extraction agent is known. The processes according to the present invention are preferably employed in the leaching of metals which occur naturally as oxide and/or sulfide ores. The processes according to the present invention are most preferably used in the leaching of divalent metal ores. Such metals include copper, zinc, cobalt and nickel. The processes according to the present invention are most preferably used in the leaching of copper.

The aqueous leach solutions treated in the processes according to the present invention contain a leaching agent which is capable of leaching the metal from the ore with which they are previously contacted. The processes according to the present invention are applicable to leaching operations wherein an aqueous leaching agent is employed. In certain preferred embodiments of the present invention the leaching agent comprises sulfuric acid. In those preferred embodiments of the present invention where the metal comprises copper, it is further preferred that sulfuric acid be used as the leaching agent. Other leaching agents which can be used in processes according to the present invention include, but are not limited to acids such as hydrochloric acid, nitric acid, organic acids and combinations thereof, and basic substances such as ammonia. Essentially, any leaching agent which is water-miscible, capable of leaching the metal from the ore and which produces a water-soluble leaching agent-metal compound can be used.

In accordance with the present invention, a high grade leach solution is generated by leaching fresh ore, usually with raffinate or a portion of the raffinate from the first solvent extraction plant, even though this is not necessarily a requirement. This high grade leach solution is advanced to a first solvent extraction to produce a first raffinate. This high grade leach solution is not combined with a low grade leach solution as has been common in the past.

Also in accordance with the present invention a low grade leach solution is generated by leaching partially leached ore and/or low grade ore, usually with raffinate, or a portion of raffinate from the second solvent extraction. This low grade leach solution is not combined with a high grade leach solution as has been common in the past, rather it is treated directly in a second solvent extraction plant.

Also in accordance with the present invention low grade leach solution is not taken to an ILS pond from which it can be distributed over fresh ore.

However, the high grade leach solution and/or the low grade leach solution may have a sufficiently high flow so that it can be divided into more than one stream, thereby resulting in multiple solvent extraction processes running in parallel. For example, the high grade leach solution can be divided into two portions which proceed to two first solvent extraction plants. In a similar manner the low grade leach solution can be further divided into two portions which proceed to two second solvent extraction plants. The way the leach solutions are divided will depend on many factors such as the metal content of the respective high and low grade leach solutions, the design of the solvent extraction plants and the size of the solvent extraction plants.

The important feature of the division of the respective leach solutions is to treat the high and low grade leach solutions separately, thereby producing a raffinate from the solvent extraction treatment of the high grade leach solution and a raffinate from the treatment of the low grade leach solution.

In the most preferred embodiments of the present invention, the high grade leach solution is subjected to solvent extraction without any mixing with the low grade leach solution. However, it is to be understood some benefit of the present invention can be realized even if some mixing of the high and low grade leach solutions takes place prior to separate solvent extraction. As long as the metal content of the high grade leach solution is greater than the average metal content associated with an equal mix of the high and low grade leach solutions and the metal value of the low grade leach solution is lower than the average metal content associated with an equal mix of the high and low grade leach solutions, some benefit of the present invention will be realized.

Solvent extraction in accordance with the processes of the present invention can be carried out in any known manner wherein aqueous leach solution is contacted with an organic phase containing a metal-specific extraction reagent. Each extraction performed in accordance with the present invention can be carried out by mixing the organic phase and the aqueous leach agent and allowing the two phases to settle. This mixing-settling can be carried out in multiple series of mixing-settling tanks with countercurrent flow of the aqueous and non-aqueous phases.

The aqueous phase resulting from a solvent extraction operation is referred to as a raffinate. In the processes according to the present invention, the high grade leach solution is subjected to solvent extraction prior to any mixing with the low grade leach solution and a first aqueous raffinate is obtained. In the processes according to the present invention, the low grade leach solution is subjected to solvent extraction prior to any significant mixing with the high grade leach solution and a second aqueous raffinate is obtained. The first raffinate produced in accordance with the processes of the present invention will generally be distributed over fresh ore while the second raffinate produced in accordance with the processes of this invention will be distributed over partially leached ore.

In preferred embodiments of the present invention, a major portion of the first raffinate will be distributed over fresh ore while a major portion of the second raffinate will be distributed over the partially leached ore. In certain increasingly more preferred embodiments of the present invention, the first raffinate will be distributed over fresh ore at 60%, 70%, 80%, 90% and greater amounts while the second raffinate will be distributed over partially leached ore at 60%, 70%, 80%, 90% and greater amounts, the amounts being measured by volume.

In the processes according to the present invention, a portion of the second aqueous raffinate may be bled from the circuit to maintain water balance or a portion of fresh water may be added to maintain water balance.

Figure 4:
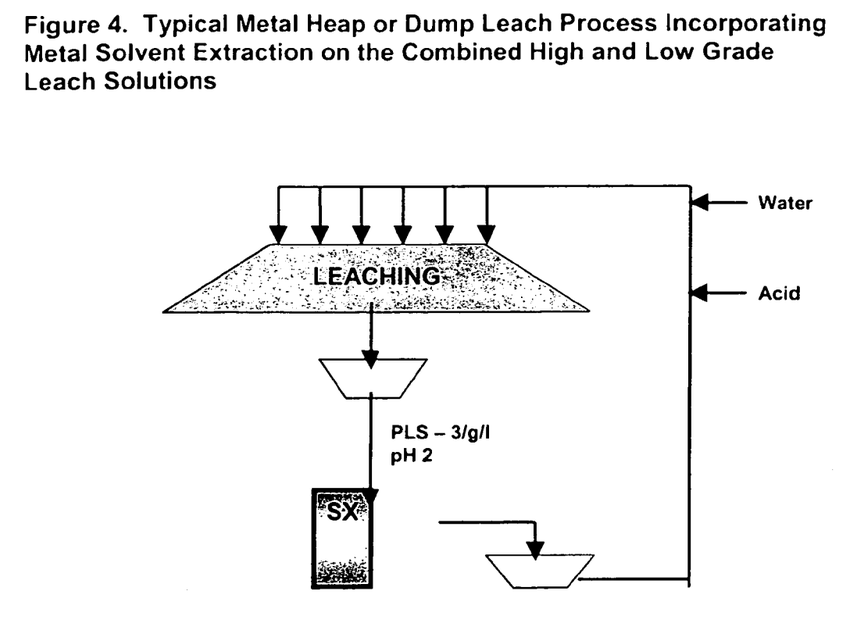
FIG. 4 is a process flow diagram representing a standard leaching/solvent extraction operation wherein the high grade and low grade leach solutions are combined and then treated by solvent extraction to generate a single raffinate.

FIG. 4 depicts a process flow diagram of a standard, prior art heap and/or dump leaching processes for copper followed by solvent extraction. The high grade leach solution is mixed with low grade leach solution to give a combined leach solution which then is subjected to solvent extraction. The raffinate produced by solvent extraction is distributed over both fresh and partially leached ore.

Figure 5:
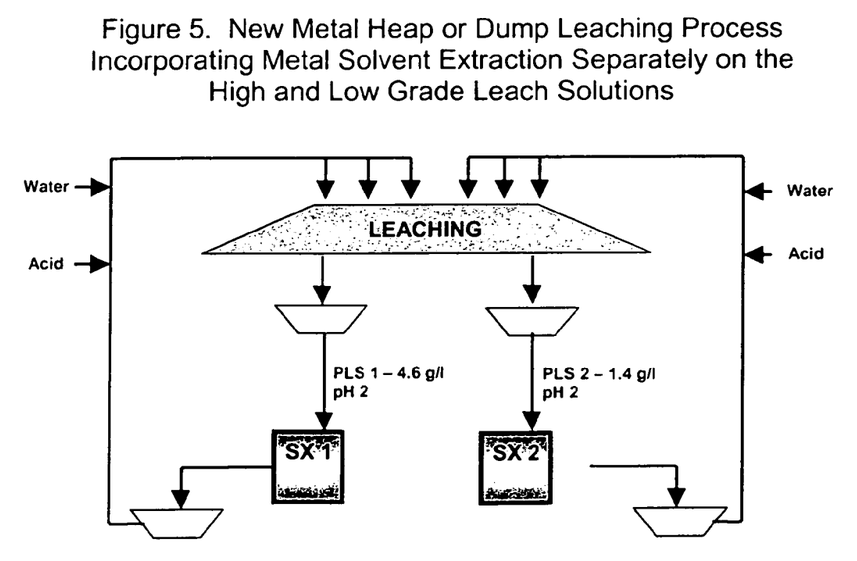
FIG. 5 is a process flow diagram representing a preferred embodiment of the present invention wherein the high grade and low grade leach solutions are treated in separate solvent extraction plants.

FIG. 5 depicts a process flow diagram of a leaching process for metal followed by solvent extraction according to a preferred embodiment of the present invention. The high grade leach solution is not mixed with the low grade leach solution. Rather the high grade leach solution is subjected to solvent extraction to produce a first raffinate which is distributed over fresh ore while the low grade leach solution is subjected to solvent extraction to produce a second raffinate which is distributed over partially leached ore.

One advantage of the process according to the present invention is that much more acid is returned to leaching of fresh ore than with the standard process. Said greater amount of acid being generated because the copper content of the high grade leach solution is higher than the copper content of a combined leach solution and hence more acid is generated in the first raffinate because of the greater amount of copper extracted.

A second advantage of the process according to the present invention is that less copper is returned to leaching the partially leached ore. Thus leaching of the partially leached ore is more complete and faster than with the prior single raffinate process containing a greater amount of copper.

A third advantage of the process according to the present invention is that the amount of copper left in the leached ore that is removed from the leaching system is less than it would be if the high and low grade leach solutions were combined prior to solvent extraction as is the practice of the present state of the art.

A fourth advantage of the split circuit design pertains to metal solvent extraction plants where another valuable metal component of value can be recovered from the low second raffinate, for example cobalt. In most cases the raffinate must be neutralized prior to cobalt recovery. Neutralization with a soluble base such as caustic or ammonia is very expensive. Therefore the lower the acid content of the raffinate stream the lower the amount of base needed for neutralization. Furthermore the use of a solution of caustic for neutralization adds water to the bleed stream, thereby diluting the valuable cobalt stream. Alternatively, neutralization can take place with lime or limestone which is a less costly base. In this case a lesser amount of acid in the bleed stream requires less lime or limestone for neutralization and in the process a lesser amount of gypsum precipitate is produced. Gypsum must be removed from the system and all the solution containing the valuable metal must be recovered. A lesser amount of gypsum allows the use of smaller equipment for the solids/liquid separation. When finely divided solids are separated from a liquid, the solids will always contain some of the liquid. In the case under discussion the lesser amount of gypsum will contain a lower volume of the neutralized raffinate stream which contains the valuable second metal component, for example cobalt. Thus the ultimate recovery of the valuable component in the raffinate stream is higher when using the dual process according to the invention.

The present invention will now be illustrated in more detail by reference to the following specific, non-limiting examples.

EXAMPLE A

Comparison of Combined and Separate Leach Solutions Using a Copper Extraction Plant Having Two Series Extraction Stages and One Strip Stage Consider the case where combining the high and low grade leach solutions gives a combined leach solution having 3 g/l Cu at a flow of 2000 $m^3$ hour. A highly accurate computer modeling of the solvent extraction circuit was done under the following conditions. The leach solution had 3 g/l Cu, 90 g/l sulfate at a pH of 1.8, values that are similar to many heap leach solutions. The organic phase was LIX® 984N, a widely used copper solvent extraction reagent, in a typical hydrocarbon diluent at a concentration to give 92% copper recovery. The advance organic to aqueous phase ratio across extraction was 1. The copper solvent extraction plant is 2 stages of counter current extraction and one stage of strip. This staging is widely used for copper solvent extraction plants. The barren strip had 35 g/l Cu and 180 g/l sulfuric acid while the rich or pregnant strip solution had 50 g/l Cu and 157 g/l sulfuric acid. Mixer efficiencies were 95% for extraction stage 2 and 92% for extraction stage 1. These mixer efficiencies are typical for the industry. The result of this computer simulation for the combined leach solution is shown in the first row of Table 1.

Now consider the case where the high and low grade leach solutions are treated separately in the same copper solvent extraction plant configuration also with LIX® 984N at a concentration needed to give 92% copper recovery using the same mixer efficiencies previously used and also using the same strip conditions. The average copper content of the high grade leach solution is 4.6 g/l Cu while the average copper content of the low grade leach solution is 1.4 g/l Cu and the respective flow for each stream will be 1000 $m^3$/hour. The results of computer simulation of these conditions for the separate leach solutions are shown in the second and third rows of Table 1.

TABLE 1

Results for a 2 Extract, 1 Strip Stage Copper Solvent Extraction Plant Treating a Combined Leach Solution Compared to Treating the High and Low Grade Leach Solutions Separately

| Leach Solution | g/l Cu | % LIX ® 984N | Cu Recovery | Average Raffinate g/l Cu |
|---|---|---|---|---|
| Combined | 3.0 | 9.93 | 92.0% | 0.24 |
| High Grade | 4.6 | 15.13 | 92.0% | 0.37 |
| Low Grade | 1.4 | 5.37 | 92.0% | 0.11 |

The computer simulated results in Table 1 show that the total reagent needed to treat the high stream and low grade stream separately is only slightly greater than the amount of reagent needed to treat the combined leach solution. For example the reagent concentration needed to treat the combined leach solution is 9.93 volume % while the average reagent concentration needed to treat the high and low grade streams separately is 10.25 volume %.

The benefit of treating the high and low grade streams separately is that the raffinate that is applied to the partially leached ore has only 0.11 g/l Cu instead of the 0.24 g/l Cu that would be applied if the combined leach solutions were treated. Thus the amount of copper left in the leached ore that will not be recovered is decreased. While a decrease in the copper content of the aqueous phase of 0.13 g/l Cu may look quite small when the very large volumes of leach solution left in leached ore reaches millions of cubic meters the total amount of copper can be substantial.

EXAMPLE B

Comparison of Combined and Separate Leach Solutions Using a Copper Extraction Plant Having One State of Series Parallel Extraction Coupled with Two Stages of Counter Current Extraction and One Strip Stage Consider the case where combining the high and low grade leach solutions gives a combined leach solution having 3 g/l Cu at a flow of 2000 $m^3$ hour. A highly accurate computer modeling of the solvent extraction circuit was done under the following conditions. The leach solution had 3 g/l Cu, 90 g/l sulfate at a pH of 1.8, values that are similar to many heap leach solutions. The organic phase was LIX® 984N, a widely used copper solvent extraction reagent, in a typical hydrocarbon diluent at a concentration to give 92% copper recovery. The advance organic to aqueous phase ratio across extraction was 1. The copper solvent extraction plant is one stage of series parallel extraction coupled with 2 stages of counter current extraction and one stage of strip. Series parallel staging has become a popular plant configuration for copper solvent extraction in the past 5 to 10 years. The barren strip had 35 g/l Cu and 180 g/l sulfuric acid while the rich or pregnant strip solution had 50 g/l Cu and 157 g/l sulfuric acid. The mixer efficiencies used are 97% for the parallel stage, 95% for extraction stage 2 and 92% for extraction stage 1. These mixer efficiencies are typical for the industry. The result of this computer simulation for the combined leach solution is shown in the first row of Table 2.

Now consider the case where the high and low grade leach solutions are treated separately in the same series parallel copper SX plant also with LIX® 984N, again at a concentration needed to achieve 92% copper recovery. All other conditions are the same as above for the 3 g/l Cu leach solution. The average copper content of the high grade leach solution is 4.6 g/l Cu while the average copper content of the low grade leach solution is 1.4 g/l Cu and the respective flow for each stream will be 1000 $m^3$/hour. The results of computer simulation of these conditions for the separate leach solutions are shown in the second and third rows of Table 2.

TABLE 2

Results for a Series Parallel Copper Solvent Extraction Plant Treating a Combined Leach Solution Compared to Treating the High and Low Grade Leach Solutions Separately

| Leach Solution | g/l Cu | % LIX ® 984N | Cu Recovery | Average Raffinate g/l Cu |
|---|---|---|---|---|
| Combined | 3.0 | 19.1 | 92.0% | 0.24 |
| High Grade | 4.6 | 19.2 | 92.0% | 0.418 |
| Low Grade | 1.4 | 19.2 | 92.0% | 0.063 |

The results in Table 2 show that the total reagent needed to treat the high stream and low grade stream separately is only 0.10 volume % greater than the amount of reagent needed to treat the combined leach solution, 19.2 volume % versus 19.1 volume %.

In this example the benefit of treating the high and low grade streams separately is that the raffinate that is applied to the partially leached ore only has 0.063 g/l Cu instead of the 0.24 g/l Cu that would be applied if the combined leach solutions were treated. Thus the amount of copper left in the leached ore that will not be recovered is decreased. While a decrease in the copper content of the aqueous phase of 0.177 g/l Cu may look quite small when the very large volumes of leach solution left in leached ore reaches millions of cubic meters, the total amount of copper can be substantial.

It will be appreciated by those skilled in the art that changes could be made to the embodiments described above without departing from the broad inventive concept thereof It is understood, therefore, that this invention is not limited to the particular embodiments disclosed, but it is intended to cover modifications within the spirit and scope of the present invention as defined by the appended claims.

What is claimed is:

1. A process for enhanced recovery of one or more metal values from heap and/or dump leaching of ores containing said metal values, the process comprising:
    (a) providing a high grade leach solution obtained by heap or dump leaching of fresh high grade ore containing a first metal value;
    (b) subjecting said high grade leach solution to a first solvent extraction of said first metal value to produce a first aqueous raffinate, and applying said first aqueous raffinate to leach fresh high grade ore;
    (c) providing a low grade leach solution obtained by heap or dump leaching of partially leached ore or fresh low grade ore of said first metal value; and
    (d) subjecting said low grade leach solution to a second solvent extraction of said first metal value to produce a second aqueous raffinate, and applying said second aqueous raffinate to leach partially leached ore or fresh low grade ore,
wherein said first and second aqueous raffinates are not intermixed prior to being applied to their respective ores for leaching.

2. The process according to claim 1, wherein said high grade leach solution results from dump leaching of fresh high grade ore and said low grade leach solution results from dump leaching of partially leached ore or fresh low grade ore.

3. The process according to claim 1, wherein said high grade leach solution results from dump leaching of fresh high grade ore and said low grade leach solution results from heap leaching of partially leached ore or fresh low grade ore.

4. The process according to claim 1, wherein said high grade leach solution results from heap leaching of fresh high grade ore and said low grade leach solution results from dump leaching of partially leached ore or fresh low grade ore.

5. The process according to claim 1, wherein said high grade leach solution results from heap leaching of fresh high grade ore and said low grade leach solution results from heap leaching of partially leached ore or fresh low grade ore.

6. The process according to claim 1, wherein said metal values are selected from the group consisting of copper, zinc, cobalt and nickel.

7. The process according to claim 1, wherein said first metal value is copper.

8. The process according to claim 1, wherein the leach solution comprises a leaching agent selected from the group consisting of sulfuric acid, hydrochloric acid and nitric acid.

9. The process according to claim 8, wherein said leaching agent comprises sulfuric acid.

10. The process according to claim 1, wherein a second metal value is recovered from said second aqueous raffinate.

11. The process according to claim 10, wherein said second metal value is cobalt.

12. A process for enhanced recovery of one or more metal values from heap and/or dump leaching of ores containing said metal values, the process comprising:
    (a) providing a high grade leach solution obtained by heap or dump leaching of fresh high grade ore containing a first metal value;
    (b) subjecting said high grade leach solution to a first solvent extraction of said first metal value to produce a first aqueous raffinate, and applying said first aqueous raffinate to leach fresh high grade ore;
    (c) providing a low grade leach solution obtained by heap or dump leaching of partially leached ore or fresh low grade ore of said first metal value; and
    (d) subjecting said low grade leach solution to a second solvent extraction of said first metal value to produce a second aqueous raffinate, and applying said second aqueous raffinate to leach partially leached ore or fresh low grade ore,
wherein at least portions of said first and second raffinates are intermixed prior to being applied to their respective ores for leaching, provided that the intermixed aqueous raffinate applied to fresh high grade ore comprises at least 60% by volume of said first aqueous raffinate, and/or the intermixed aqueous raffinate applied to partially leached ore or fresh low grade ore comprises at least 60% by volume of said second aqueous raffinate.

13. The process according to claim 12, wherein the intermixed aqueous raffinate applied to fresh high grade ore comprises at least 70% by volume of said first aqueous raffinate, and the intermixed aqueous raffinate applied to partially leached ore or fresh low grade ore comprises at least 70% by volume of said second aqueous raffinate.

14. The process according to claim 12, wherein the intermixed aqueous raffinate applied to fresh high grade ore comprises at least 80% by volume of said first aqueous raffinate, and the intermixed aqueous raffinate applied to partially leached ore or fresh low grade ore comprises at least 80% by volume of said second aqueous raffinate.

15. The process according to claim 12, wherein the intermixed aqueous raffinate applied to fresh high grade ore comprises at least 90% by volume of said first aqueous raffinate, and the intermixed aqueous raffinate applied to partially leached ore or fresh low grade ore comprises at least 90% by volume of said second aqueous raffinate.

16. The process according to claim 12, wherein said metal values are selected from the group consisting of copper, zinc, cobalt and nickel.

17. The process according to claim 12, wherein said first metal value is copper.

18. The process according to claim 12, wherein the leach solution comprises a leaching agent selected from the group consisting of sulfuric acid, hydrochloric acid and nitric acid.

19. The process according to claim 18, wherein said leaching agent comprises sulfuric acid.

20. The process according to claim 12, wherein a second metal value is recovered from said second aqueous raffinate.

21. The process according to claim 20, wherein said second metal value is cobalt.

22. A process for enhanced recovery of a second metal value from heap and/or dump leaching of ores containing the metal values, the process comprising:

(a) providing a high grade leach solution obtained by heap or dump leaching of fresh high grade ore containing a first metal value;

(b) subjecting said high grade leach solution to a first solvent extraction of said first metal value to produce a first aqueous raffinate, and applying said first aqueous raffinate to leach fresh high grade ore (c) independently of (a) and (b), providing a low grade leach solution obtained by heap or dump leaching of partially leached ore or fresh low grade ore of the first metal value;

(d) subjecting said low grade leach solution to a second solvent extraction of said first metal value to produce a second aqueous raffinate;

(e) subjecting either all or a portion of said second aqueous raffinate to a recovery process for a second metal value; and (f) applying the portion of the second raffinate that is not treated for recovery of said second metal value to leach partially leached ore or fresh low grade ore.

23. The process according to claim 22, wherein at least portions of said first and second raffinates are intermixed prior to being applied to their respective ores for leaching, provided that the intermixed aqueous raffinate applied to fresh high grade ore comprises at least 70% by volume of said first aqueous raffinate, and/or the intermixed aqueous raffinate applied to partially leached ore or fresh low grade ore comprises at least 70% by volume of said second aqueous raffinate.

24. The process of claim 22, wherein said first and second aqueous raffinates are not intermixed prior to being applied to their respective ores for leaching.

* * * * *

UNITED STATES PATENT AND TRADEMARK OFFICE
CERTIFICATE OF CORRECTION

PATENT NO. : 7,635,457 B2 Page 1 of 1
APPLICATION NO. : 11/230391
DATED : December 22, 2009
INVENTOR(S) : Kordosky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1119 days.

Signed and Sealed this

Twenty-first Day of December, 2010

David J. Kappos
*Director of the United States Patent and Trademark Office*